Nov. 24, 1942.  S. B. FREIBERG  2,303,074
VISIBLE MARGIN FILE
Filed Jan. 9, 1939  4 Sheets-Sheet 1
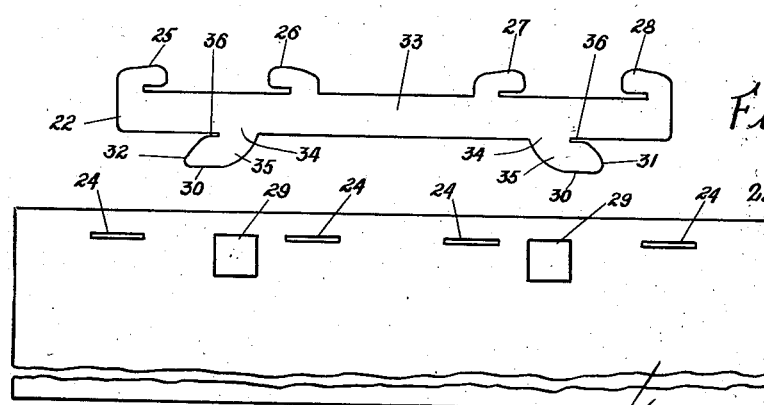
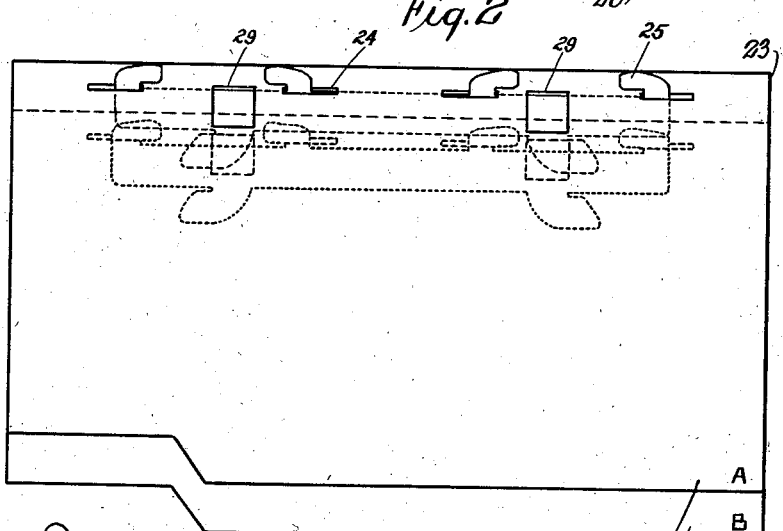
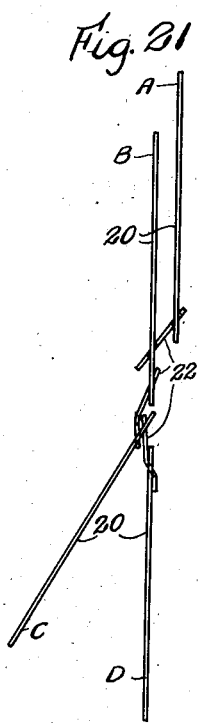
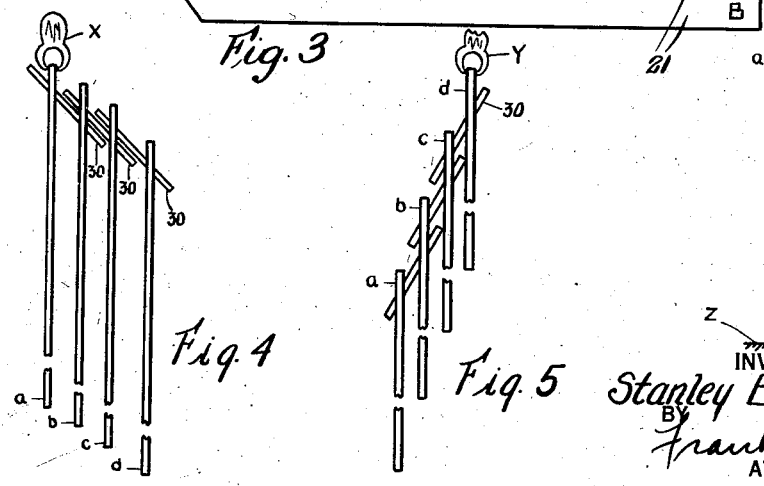
INVENTOR
Stanley B. Freiberg.
BY Frank Pugelter
ATTORNEY Nov. 24, 1942.　　　S. B. FREIBERG　　　2,303,074
VISIBLE MARGIN FILE
Filed Jan. 9, 1939　　　4 Sheets-Sheet 2
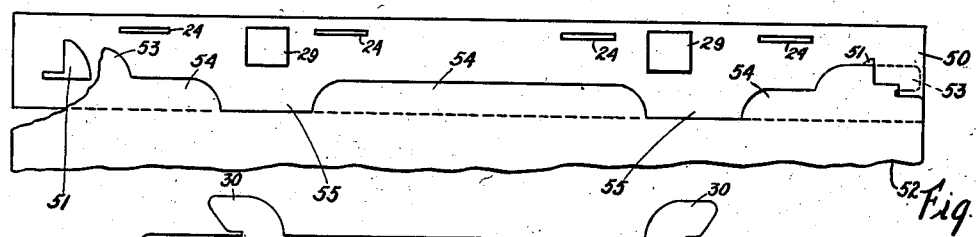
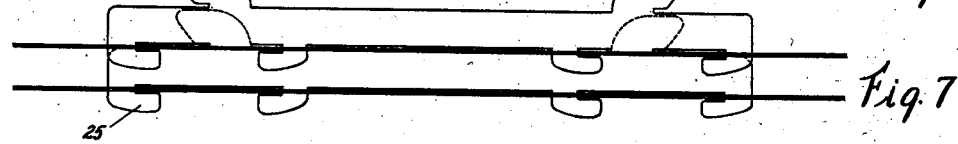
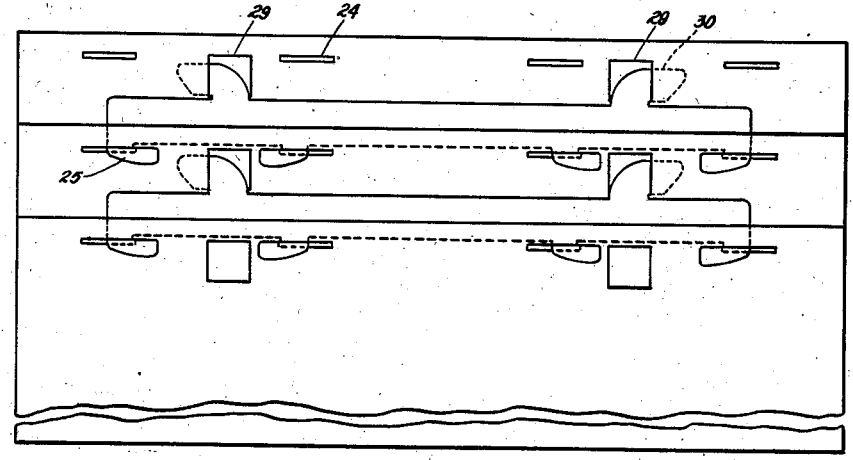
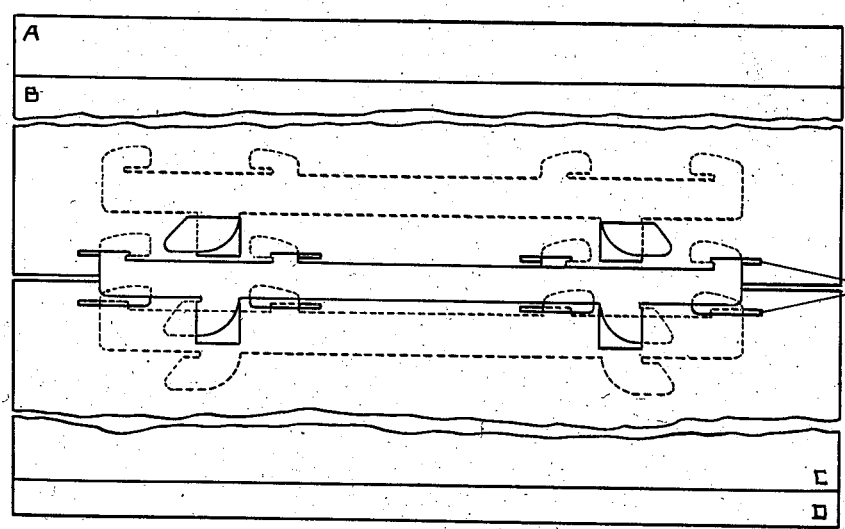
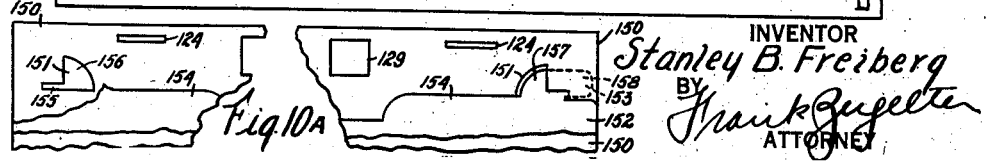

Nov. 24, 1942. S. B. FREIBERG 2,303,074
VISIBLE MARGIN FILE
Filed Jan. 9, 1939 4 Sheets—Sheet 3
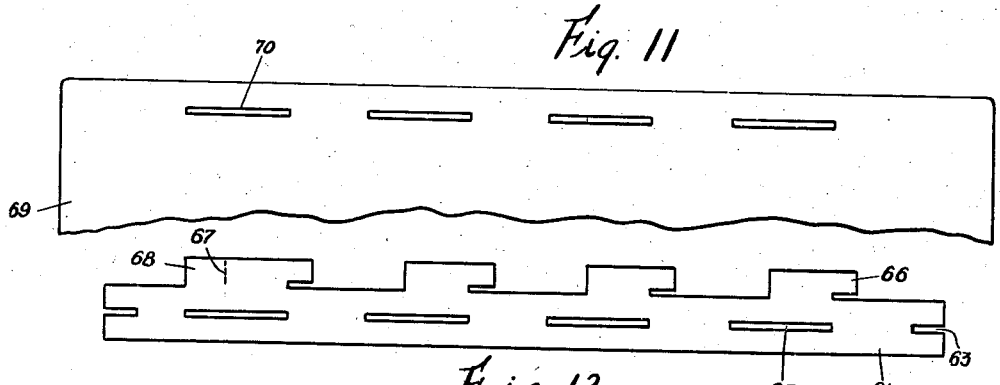
Fig. 11
Fig. 12
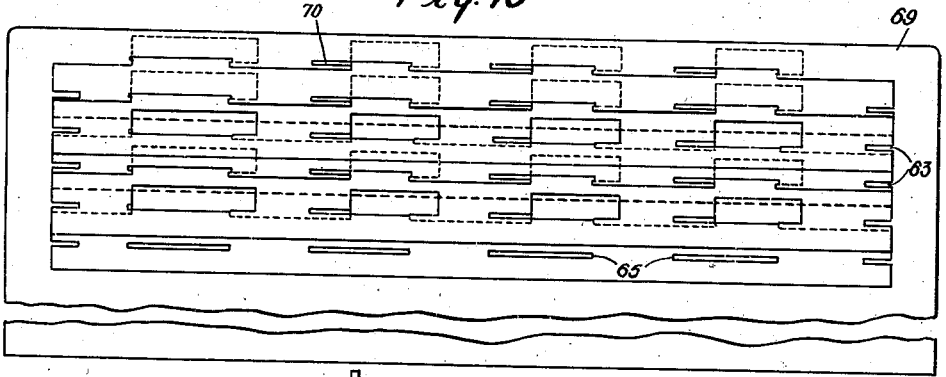
Fig. 13
Fig. 14
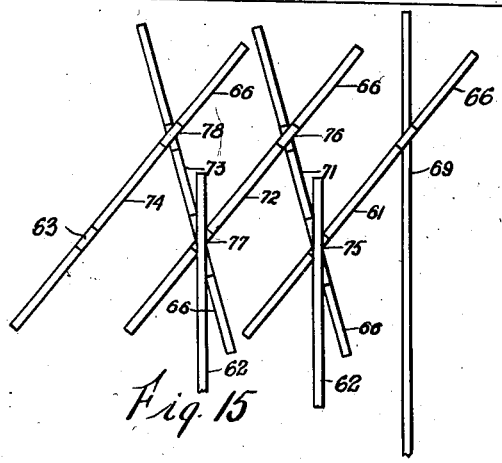
Fig. 15
INVENTOR
Stanley B. Freiberg
BY
Frank Buzelli
ATTORNEY Nov. 24, 1942.　　　S. B. FREIBERG　　　2,303,074
VISIBLE MARGIN FILE
Filed Jan. 9, 1939　　　4 Sheets-Sheet 4
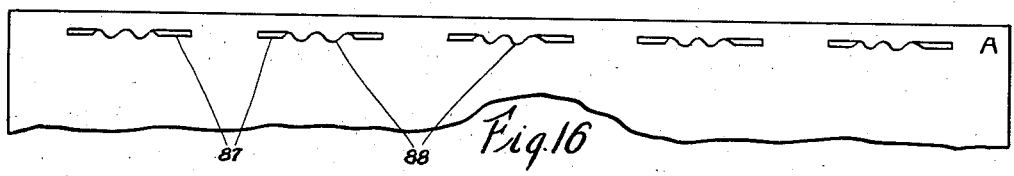
Fig.16
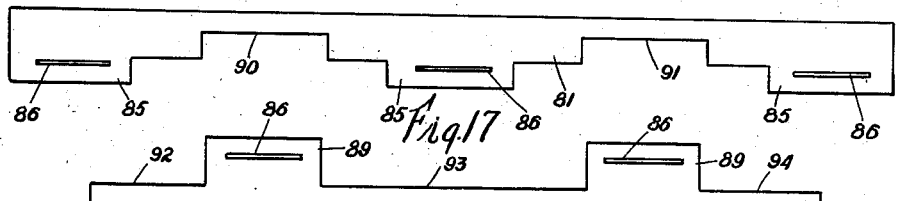
Fig.17
Fig.18
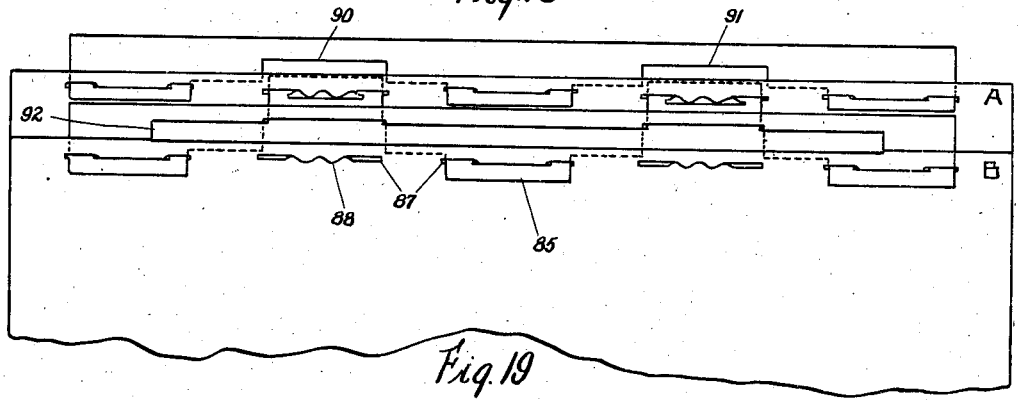
Fig.19
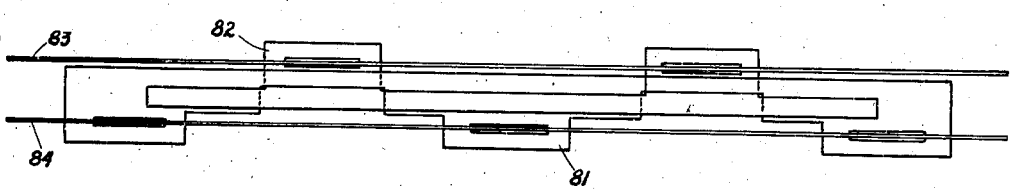
Fig.20
INVENTOR
Stanley B. Freiberg
BY Frank Zugelter
ATTORNEY Patented Nov. 24, 1942

2,303,074

UNITED STATES PATENT OFFICE 2,303,074

VISIBLE MARGIN FILE

Stanley B. Freiberg, Cincinnati, Ohio

Application January 9, 1939, Serial No. 249,837

24 Claims. (Cl. 129—16.5)

This invention is concerned with record cards or equipment of the character wherein it is desired to make readily available, an individual card or cards of a given group, by exposing one or more of the marginal portions of such card or cards.

An object of the invention is to provide an arrangement and means whereby a plurality of cards may be readily coupled and separated, as well as to be readily extended for use and compacted for storage or housing thereof in common filing drawers or cabinets.

Another object of the invention is to provide an arrangement of the character indicated wherein the record cards themselves or any parts or extensions thereof do not necessarily constitute part of the mechanism for attaining the stated objectives.

These and other objects are attained by the means described herein and illustrated in the accompanying drawings, in which:

Fig. 1 is a plan view of a link forming a detail of the invention.

Fig. 2 is a fragmental plan view of a record card, embodying details of the invention and showing such portion of the card as is adapted for assembling or uniting a card with a link.

Fig. 3 is a plan view of a plurality of assembled links and cards, embodying the invention.

Fig. 4 is a fragmental edge view of a group of assembled links and cards, showing the relationship thereof, incident to extending the group for rendering individual cards available for examination or entry of data thereon.

Fig. 5 is a fragmental edge view, similar to Fig. 4, but showing the relationship established between the assembled cards and links as an initial step to closing or compacting the cards preparatory to returning the cards to a blind file or the like.

Fig. 6 is a fragmental edge view, similar to Figs. 4 and 5, showing various positions assumed by various of the cards and links incident to movement thereof from the relationships shown in Fig. 5 to a closed or compacted relationship.

Fig. 7 is a view showing two of the cards disposed at right angles to two of the links associated with the cards.

Fig. 8 is a plan view showing an assembly of cards and links extended to the maximum degree.

Fig. 9 is a plan view of an assembly of cards and links, some of which have been turned at approximately 180 degrees relative to others thereof.

Fig. 10 is a fragmental plan view of a card and card carrier, embodying a modified form of the invention.

Fig. 10A shows a modified arrangement of carrier and card of the type shown in Fig. 10.

Fig. 11 is a fragmental plan view of a base or carrier card forming a detail of a modified form of the invention.

Fig. 12 is a plan view of a link forming a detail of the last referred to modified form of the invention.

Fig. 13 is a fragmental plan view of a record card adapted to cooperate with the links of the type shown in Fig. 12.

Fig. 14 is a plan view of a plurality of links of the type shown in Fig. 12, assembled together into cooperating pairs, connected to a carrier card, the links being disposed in an extended position.

Fig. 15 is an enlarged end view of an assembly of parts shown in Fig. 14, the links being shown in approximately the relation that they assume, when the links are in closed or assembled position.

Fig. 16 is a fragmental plan view of a card forming a detail of another modified form of the invention.

Figs. 17 and 18 are plan views of cooperating connector links forming details of the last mentioned modification of the invention.

Fig. 19 is a fragmental plan view of an assembly of a plurality of cards and links of the type shown in Figs. 16, 17 and 18.

Fig. 20 is a view of parts shown in Fig. 19, the cards having their edges substantially coplanar, the cards being disposed in an expanded or extended relationship.

Fig. 21 is an end view of parts shown in Fig. 9, and shows approximately the positions taken by such parts during manipulation thereof, it being understood that flexing of any one part or number of parts is not as sharp or decided as shown in the drawings because of the nature of sheet material from which such parts are preferably fabricated.

The record cards or sheets 20 may be of any shape, form or size. It is contemplated that all the cards of a given group will be substantially identical, so that corresponding ends or edges of the group of cards may be placed in such overlapped relation as will provide a so-called visible margin 21 upon which various indexing or qualifying data may be applied for readily distinguishing the cards from one another, according to the data to be compiled on such cards. The cards shown herein are generally rectangular, although that form is not essential. The card edges opposite to the portions that are to constitute the overlap or visible margins 21 are connected one to the other, in sequence, by links 22. Such card edges for purpose of description may be termed the pivoted or connected edges, the visible margin edges being termed the free edges of the card. Also for the purpose of description only, the portion of any card that is to be connected to another card as mentioned, may be called the attachment edge or end of the card as distinguished from the opposite and visible margin end or edge of the card.

In the preferred form of the invention, shown in Fig. 1 and Fig. 2, the attachment edge or end 23 of the card 20 is provided with a series of aligned elongated and relatively narrow slots, pockets or eyes 24. The exact number of such pockets or eyes is not essential, although they should be sufficient in number and their spacing should be such that adequate anchorage is provided for the lugs or fingers such as 25, 26, 27 and 28 of a link 22, and each of which fingers or lugs is intended to enter into one of such pockets. The lugs or fingers, when introduced into such pockets, are intended to effect such an interlock between the card and the link, that one card and one link may be termed a unit of the invention. The indicated pockets 24 and fingers 25 to 28 inclusive, for purposes of description, may be called interlock pockets and interlock fingers.

The free or outer edges of the fingers 25 to 28 inclusive recede or taper somewhat, as shown in Fig. 1. Thus the widest portion of each such finger is adjacent the free or leading end of such finger and is spaced from or separated from the body 33 of the link. It will be observed that such enlarged or leading end of each of such fingers is disposed beyond the ends of the slots 24 of the cards, when cards and links are assembled. This relationship precludes the leading ends of the fingers from becoming entangled in any manner or way with the slots of the cards and assures free and ready manipulation of the various units of cards and links relative to one another.

Each card, in addition to pockets 24, is provided with a plurality of relatively wide but shorter pockets, slots or openings 29, which, for purpose of differentiation from interlock pockets 24, may be termed connector pockets. The number of connector pockets may be varied. Each link such as 22, is provided with connector fingers or lugs 30 each of which are adapted to enter one of the connector pockets in a card for connecting or attaching one card and link unit to another similar unit. Thus an indefinite number of units may be attached to form a long chain of units. Preferably, the attachment or connector lugs or fingers 30 have their free ends 31, 32 extending laterally in opposite directions so that some slight flexing, bending or bowing of the link or the card or both, is availed of to introduce the connector lugs into the connector pockets, or to remove such lugs from such pockets. The connector lugs are formed along one edge of the body 33 of the link 22, and the interlock lugs or fingers are formed along the opposite edge of the body 33 of the link.

Preferably the width of the body 33 of the link is the same as the width of the connector pockets or slots 29.

The connector lugs comprise a neck 34 whereby the lug is attached to the link, and an intermediate portion or body 35 which unites the neck and free end, lip or lap portions 31 or 32. The neck is of a width approximating the length of the connector pocket in a card, and the necks of a pair of connector lugs on one link are spaced equidistant to the spacing of a pair of connector pockets 29 of any given card.

By reason of the laterally extending positions given to the free ends or tips 31, 32 of the connector lugs, there is developed a notch or slit 36 between each lug and the adjacent longitudinal edge of the link. That slit is slightly wider than the thickness of the cards with which the link is to be used. Consequently a card and link, when connected by means of connector pockets and lugs, have a relative movement approximating the width of the connector pockets and also approximating the width of the link.

The relationship of the interlock lugs and the connector lugs to the body of the link and to the cards associated with any link are the same in that the opposite longitudinal edges of the link body serve as fulcrums or axes about which the cards turn in the ordinary manipulation of the cards incident to turning them back and forth for rendering opposite faces of the cards available for observation or entry of data thereon, while disposed echelon.

The various pockets are positioned in such proximity to the pivoted or hinged ends of the cards, and the links and its associated lugs are so related to one another and to the cards, that when two adjacent connected cards are disposed in fully extended position and project in opposite directions, and at which time such cards are substantially coplanar, the pivoted ends of such cards are preferably spaced apart at a minimum distance, for example, about one-sixteenth ($\frac{1}{16}$) of an inch. Thus sufficient clearance is provided between adjacent cards and each and every one of the cards in a connected series of such cards is capable of assuming a substantially flat position, having either of its faces exposed upwardly, regardless of the position that such card may hold in any group of connected cards.

In instances where a new card or unit is to be added to a given group, or where a card is to be removed from a given group, it is necessary only to separate the group at the selected place and make the necessary changes. When the group has been separated at the selected place, a new card or unit is inserted by introducing the connector lugs thereof in the connector pockets of the one card and likewise the connector lugs of the previously detached unit are inserted in the connector pockets of the newly added unit. If a card or unit is being deleted, the cards or units on opposite sides of the removed card are joined together, thus completing or re-establishing the connected group.

The interlock lugs should not extend beyond the margin of a card of a given unit, thus avoiding any interference to free and easy manipulation of the cards on the links which serve as hinge pins as well as connectors between adjoining or adjacent cards.

The interlock lugs or fingers 25, 26, 27 and 28 and the slots or pockets 24 for receiving same are so related that they effect a hinge connection with and about one another upon a substantially fixed or immovable axis as distinguished from the slidable or shiftable axis effected between the connector lugs or fingers 30 and the connector pockets or openings 29 that receive said lugs 30. For the purpose of differentiating the pivotal connections between lugs such as 25 and the cooperating pockets or openings that receive same, the connections thereof will be referred to as a fixed axis hinge connection. On the other hand, the pivotal connections between lugs such as 30 and the cooperating pockets or openings that receive same, will be referred to as providing a shifting or sliding axis pivot or hinge connectoin.

It will be observed that both the fixed and shifting axes are coplanar with the thickness dimension of one of the cards. By reason thereof, the cards in both extended, echelon relationship and in consolidated positions with the corresponding edges of the cards in coplanar relationship, are adapted to have their adjacent faces in contact, one upon the other. By reason thereof, it is possible to compact the cards in a cubical space which approximates but does not substantially exceed a volume of two times the thickness of the cards.

In Figs. 4, 5 and 6, there are shown, various positions that may be and which are assumed by the various cards and links, incident to manipulation thereof, to various relationships. Normally, when the cards are in closed or compacted form, in an ordinary drawer of suitable filing equipment or the like, the corresponding edges of all cards of any group of cards are aligned or coplanar.

When a group of cards in such normal condition, is removed from a drawer, the operator may hold or grasp the foremost card $a$ as shown at X of Fig. 4, permitting the other cards $b$, $c$, $d$, etc., and links 22 to slide relative to one another with adjacent faces of adjacent cards in contact upon one another until the free or visible margins or edges of the cards are exposed, one beneath the other, echelon, in the fashion of ordinary visible record cards and the like. At such times, the individual cards may be manipulated to expose any face of any card. Fig. 4 shows the cards as spaced, in order to clearly show the relationship thereof to the links, whereas in practice the cards are in contact upon one another.

When the cards are to be returned to closed or normal position, the operator may hold or grasp the hinged end of the lowermost card of a group, for example, the card $d$, as shown at Y in Fig. 5, and the bottom card of such group may be brought into contact with a surface, such as a table top Z or an operator's hand, and as the hand Y is moved toward the surface Z, the cards $b$, $c$, etc., contact in sequence, the surface Z, and the links and cards are automatically moved to positions such that thereafter the cards may be brought into position with one another, having adjacent faces of adjacent cards in contact and corresponding edges of the cards are returned to coplanar relationship.

Fig. 8 shows the positions assumed by various parts when supported from the back or last card and viewed from the front of the group.

In the modified forms of the invention, the same general results and cooperation of generally similar parts, is attained.

In the form shown in Fig. 10, a card carrier 50 corresponds to the hinged or connected end or portion of a card such as 20, and has suitable slot or pocket arrangements or means as indicated at 51 at its side edges, for cooperation with a card 52, provided with complementary connector lugs or means 53 for insertion into the pockets 51. This arrangement provides for ready attachment and detachment of the card carrier 50 and card 52. The card and card carrier are so constructed that a card and card carrier, when assembled, are to all purposes and intents, a single unit for manipulation together as an integral card. The specific means for effecting such integral union of the card and card carrier is incidental. As shown herein, lugs 54, pockets 55 and adjoining areas on the card cooperate with the lower free edge and adjoining areas on the card carrier. In this connection, the central lug 54 may be positioned to engage or contact one face of carrier 50 and the end lugs 54 may contact or engage the opposite face of carrier 50, in lieu of the arrangement shown.

In the modified forms of the invention shown in Figs. 11 to 15 inclusive, the various links or connectors 61 are joined together, and the cards 62 are detachably mounted on the links in any suitable manner. As shown herein, the interengaging slot and lug arrangements 63 and 64 at the side edges of the cards and links are used for that purpose.

The links each comprise a narrow, elongated member having a series of aligned long narrow slots or pockets 65 therein and having a series of interlocking bayonet type lugs 66, one each of which registers with and is inserted in a slot in the next adjacent link. Ready separation of the lugs of one link from the pockets of its associated or cooperating link may be effected by slitting the end lug 66 transversely as shown at 67 so as to facilitate assembly. After assembly, the fractional lug portion 68 precludes movement of the lugs longitudinally of the pockets 65, thus preventing accidental separation of the parts. The flexible nature or character of the cards and links, permit ready manipulation of the indicated parts for accomplishing the indicated relationships.

In this particular embodiment of the invention, it may be found desirable to provide a base card or support card 69, provided with slots or pockets 70 into which the lugs 65 of a given link 61 may be lodged or secured. Thus, an extended linkage comprising individual links 61 may be secured to and supported by the base card 69, without regard as to whether any cards 62 are connected to or supported by the links 61.

The links 61 are preferably associated in pairs, each of the pairs being employed to support one of the cards such as 62. Such pairs are shown as links 71 and 72 and 73 and 74 in Fig. 15. By reference to Fig. 15, it will be observed that the lugs 66 of link 61 extend through the support card 69, that lugs 66 of link 71 extend through card 69 in such position that said last mentioned lugs may rest against the base card 69 when the linkage is folded or collapsed. It will also be observed that lugs 66 of link 72 extend through link 71 so that said lugs 66 lie between the link 71 and the base card 69. In like manner, the lugs of each succeeding link extend through the next preceding link, so as to provide an indefinitely extended criss-crossing of links. Thus there are provided pairs of links, each pair of which comprises two pairs of pockets 63, for holding cards such as 62. Each pair of such pockets may be used for holding a card such as 62. By reference to Fig. 15, it will be observed that a pair of such pockets will be disposed in alignment with each crossing or cross-over such as 75 to 78 inclusive of the connected links. Thus the pairs of pockets 63 may be called upper pockets such as 76 and 78 and lower pockets such as 75 and 77. In applying cards to the indicated linkage, preferably only one set or class of pockets 63 should be

that the instant invention is adaptable to such structures as shown in said Daniels patent by providing the card with pockets or openings as shown herein at 29, and by providing lugs such as 30 on such tabs or extensions for cooperation with such pockets. However, as previously noted herein, the arrangement is objectionable to the extent that if the tab is integral with the card, the useful life of such parts is limited to the number of times that the tab and card may be bent or turned about their hinged connection before rupture and separation thereof. While such period of use may obviously be prolonged by reinforcing same, for example, by a flexible fabric strip or the like attached to the tab and the card and extending over and forming part of the hinged connection of the tab and the card, the disadvantages of increased bulk, extra operation and cost of fabrication and the like, make it appear that the preferred form of the invention should avoid reliance on any hinge structure or arrangement that would ultimately or eventually result in such rupture or fracture of any part of a record card as would require substitution of a new record card for the destroyed or mutilated card and the attendant transfer to the substituted card of the data and information contained by the defective card.

In the broad sense of the invention, as presented in some of the appended claims, it is contemplated that the links or the equivalents thereof, as well as the pockets for cooperation with the links, may be formed in or from the body or main portion of a record card or sheet, as well as being formed on or as part of a tab as explained in the preceding paragraph.

When the cards are placed or moved into their closed, compacted or folded position, they form a pile or stack, having a substantially right angled cubical form, for example, as shown in Fig. 1 of Hiller Patent 2,001,462, or Fig. 2 of Daniel Patent 2,064,737. Yet each card is wholly coplanar and complete in itself, and no part of any card or record sheet is bent or turned upon itself in order to provide a hinge or pivot to permit selective movement of any card or cards through an arc of 180° whereby to attain exposure of either side of the selected card or cards. Moreover, no tray or support is necessary with the cards, incident to their use or movement to either of two extended positions with the exposed marginal edges in overlapped echelon relationship.

All of these factors and functions are present in all forms of the invention.

What is claimed is:

1. The combination with a pair of sheet material record cards of a sheet material link connecting the cards and having a free and independent hinge connection with each card one of said hinge connections being coplanar with the thickness dimension of one of said cards.

2. The combination with a series of sheet material record cards of linkage comprising sheet material links independently attachable to and detachable from said cards, said links having opposite portions thereof hingedly connected to adjacent cards one of said hinge connections being coplanar with the thickness dimension of one of said cards.

3. The combination of a series of sheet material record cards, a sheet material link between each two succeeding cards in the series, a hinged connection at each of opposite sides of each link for pivotally and hingedly uniting the links and cards in a continuous series, the cards and links each being freely and independently movable about the axes of said hinged connections one of said hinge connections being coplanar with the thickness dimension of one of said cards.

4. The combination of an extended series of sheet material cards and sheet material links in alternate sequence, the links having their opposite edges hingedly connected with adjacent cards of the series each of said links having one hinge connection to a card disposed with its axis coplanar to the thickness dimension of said card.

5. The combination of a series of record cards, a pair of hingedly connected flat sheet material link members between each of two adjacent record cards, each pair of link members being independent of and having no direct connection to any of the other pairs of link members, and cooperating means on the link members and the cards for detachably and hingedly connecting the link members and the cards.

6. The combination with flat sheet material record cards of separate and individual flat sheet material links having sliding and hinged connection with the cards said hinged connections having axes coplanar with the thickness dimensions of the cards whereby to provide an assembly of cards and links movable to and from extended and compacted positions, in the former of which the marginal portions of the cards are disposed echelon.

7. A card of the class described having along its one edge, a plurality of slots or openings having an edge of each slot substantially aligned with an edge of each of the other slots, certain of the slots being relatively narrow and other of the slots being relatively wide.

8. A card and link unit comprising a card having a plurality of narrow aligned slots along one of its edges and a plurality of wider aligned slots along the same card edge, and an elongated link having pairs of oppositely extending lugs projecting from opposite longitudinal edges thereof, the lugs on opposite sides of the link being selectively complementary to the two types of slots in the card and insertible in such slots for detachably uniting the card and the link, the narrow slots and the complementary lugs therefor providing only a hinged connection between the card and the link and the wider slots and complementary lugs therefor providing a hinged and sliding connection between the card and link.

9. A card and link unit assembly comprising a plurality of cards each having aligned slots along an edge thereof and means for connecting adjacent cards and each comprising a link with spaced lugs, said lugs having sliding and hinged connection with and in the slots of one of two adjacent cards and having hinged connection only with the next of such two adjacent cards.

10. The combination of a plurality of record sheets of similar outline and flat sheet material links each having detachable connection with adjacent cards for hingedly connecting the sheets in sequence for exposing marginal edges of the sheets in echelon of different degrees when disposed in positions varying from one another by approximately one hundred and eighty degrees (180°).

11. The combination of a sheet material carrier member having a pair of spaced slots or openings therein, said slots or openings comprising elongated aligned portions and enlarged portions extending from said aligned portions in substantial parallelism with one another and having communication with said aligned portions, and a sheet material card having spaced trunnions along one of its edges, said trunnions comprising free ends extending in opposite directions and extending in part into said aligned opening portions, the enlarged portions of the openings registering with the trunnion portions intermediate the free end of the trunnions and the card portions from which said trunnions extend, said registering portions of the trunnions being smaller than said registering opening portions, whereby the trunnions may move in said openings for pivoting the card on said carrier member.

12. In a record device the combination with a plurality of individual record sheets, of separate means between succeeding record sheets and constituting the sole means for connecting the sheets in an extended sequence, said separate means being hingedly connected to said sheets, whereby the sheets may be selectively moved to a collapsed or folded position and into either of two extended positions, the sheets in the folded positions being disposed with the corresponding lateral edges thereof in coplanar relationship whereby to collectively assume a substantially right angled cubical formation and in the extended positions having the edges of the sheets in overlapped echelon relationship for selectively exposing opposite sides of the marginal edges of the sheets, said sheets when disposed echelon being movable about their hinged connections through an arc of approximately one hundred and eighty degrees (180°), said exposed opposite sides of the marginal edges of the sheets being wider when extended in one direction echelon and narrower when extended echelon in the opposite direction.

13. The combination with a plurality of record cards of links hingedly and slidably connecting the cards so the cards may be selectively moved to any of three relative positions, including two extended positions, with the marginal edges of the cards in echelon in each of said positions, and with opposite faces of the cards exposed when in said alternate extended positions, and a third position wherein the edges of all the cards are so aligned that a substantially cubical right angled stack is effected, said exposed opposite sides of the marginal edges of the sheets being wider when extended in one direction echelon and narrower when extended echelon in the opposite direction.

14. The combination with a plurality of record sheets of similar outline, of relatively rigid means having their opposite edges in hinged connection with adjacent pairs of said sheets, whereby to provide an extended and connected sequence of sheets and said means, said hinged connection or coupling of sheets and said means adapted to permit stacking of the sheets in substantially right-angled cubical form and also permitting movement of the sheets into extended positions with corresponding marginal edges of the sheets in overlapped exposed echelon position, each of said sheets being movable through an arc of approximately one hundred eighty degrees (180°) when the sheets are disposed in extended position, said exposed opposite sides of the marginal edges of the sheets being wider when extended in one direction echelon and narrower when extended echelon in the opposite direction.

15. The combination with a pair of record cards of connecting linkage having a fixed axis hinge connection with one of the cards, at an edge of said card and having a sliding axis hinge connection with the other of said cards, whereby said cards may be selectively moved in opposite directions to extended positions echelon relative to one another, with a face of each card in contact with a face of the adjacent card, or to consolidated positions with the same faces of the cards in contact and with the corresponding lateral edges of the cards disposed coplanar with one another.

16. The combination set forth in claim 15, characterized by the shiftable and fixed hinge axes being coplanar with the thickness dimensions of the cards.

17. The combination with a pair of record cards of linkage having a fixed axis hinged connection with one card and a shifting axis hinged connection with the other card, said cards and linkage being of approximate identical thickness whereby in folded or collapsed position of said cards and linkage, the overall thickness thereof approximates but does not substantially exceed a volume of two times the thickness of the cards.

18. The combination set forth in claim 17, characterized by the shiftable and fixed hinge axes being coplanar with the thickness dimensions of the cards.

19. The combination with a pair of sheet material record cards of flat sheet material linkage means having a fixed axis hinge connection with one of said cards, said axis being coplanar to the thickness dimension of said card, said linkage having a hinge connection with the other of said cards, said last mentioned hinge connection having an axis shiftable in relation to one of said cards, the linkage and cards being adapted to assume a condensed or consolidated form with the flat faces of the linkage and cards in substantial parallelism with one another and with the adjacent faces of adjacent cards in contact upon one another.

20. A link of the class described comprising a flat sheet material body portion and pairs of lugs extending from opposite longitudinal edges thereof, the lugs on common edges of the body portion being disposed in pairs, the lugs each having a leading end extending laterally in a direction opposite to that of a similar leading edge of the other lug of a given pair of lugs, the lugs along one side of the body portion having their outer edges receding from the leading ends thereof, whereby to provide an enlargement at the extreme ends of the leading ends thereof.

21. The combination of a series of cards, card connecting means each comprising a pair of sheet material link sections, each pair having a hinged connection therebetween to form a link, and hinged connections between each card and a pair of the links, the hinged connections of the cards and the links having their axes disposed coplanar to the thickness dimensions of the cards.

22. The combination with a plurality of sheet material record cards of a plurality of sheet material links connecting the cards and having free and independent hinge connections with the cards, said hinge connections being coplanar with the thickness dimensions of the respective cards with which said hinge connections are associated.

23. The combination with a plurality of sheet material record cards of a plurality of separate, unitary sheet material links, and hinge means associated with the record cards and the links whereby to hingedly connect the links and cards and whereby to provide an extended or continuous sequence of hingedly connected links and cards, said hinge means providing axes coplanar with the thickness dimension of the cards and about which axes the cards and links may be moved for moving the cards to and from positions wherein the cards assume a substantially cubical stack form and an extended form with the marginal edges of adjacent cards in echelon relation.

24. In a record system comprising a plurality of sheet material record cards adapted for compacting thereof into substantially right angled cubical stack formation and for extension thereof with the marginal edges of adjacent cards in echelon relation, the combination of a plurality of sheet material record cards, a plurality of separate, unitary sheet material links, and hinged connections for joining the links and cards, the hinged connections having axes of rotation disposed coplanar to the thickness dimensions of the cards.

STANLEY B. FREIBERG.